United States Patent Office 3,145,182
Patented Aug. 18, 1964

3,145,182
METHOD FOR IMPROVING HYDROLYSIS RESISTANCE OF URANIUM CARBIDE CONTAINING COMPOSITION
Joseph P. Hammond and John D. Sease, Knoxville, Tenn., assignors to the United States of America as represented by the United States Atomic Energy Commission
No Drawing. Filed May 21, 1962, Ser. No. 196,534
20 Claims. (Cl. 252—301.1)

The present invention relates to a method for improving the corrosion and hydrolysis resistance of chemically reactive carbides, particularly uranium carbides, and to the resultant products produced thereby.

A major obstacle to the production of economical power from nuclear reactors is the lack of completely satisfactory solid nuclear fuel which can operate at high power levels to high fuel burn-ups at high temperatures. Uranium carbide is characterized by a desirable combination of physical and nuclear properties for use as a solid nuclear fuel under such conditions. Among the desirable physical and nuclear properties of this compound are high melting point, high uranium density, high thermal conductivity, low parasitic neutron absorption cross section and good thermal and radiation stability. A review of current knowledge concerning the use of uranium carbide as a nuclear fuel is given in Nuclear Engineering, vol. 5, No. 51, September 1960, pages 353-357.

In order to take advantage of these desirable properties and particularly its uranium density, fuel element shapes and parts fabricated from uranium carbide powder must be pressed and sintered at temperatures of the order of 2000° C. As a practical matter, such high temperatures are technically difficult to achieve and expensive to maintain on a production basis. Moreover, at such high temperatures there is a distinct tendency for the uranium to volatilize, leaving a sintered compact of undetermined fuel content. In our co-pending application, S.N. 157,052, now U.S. Patent 3,118,764, an improved method of fabricating uranium carbide at temperatures of the order of 1200-1600° is described which method comprises forming a homogeneous mixture of powdered uranium carbide, a uranium metallic compound which wets and forms a eutectic with said carbide and has a non-uranium component which has a relatively high vapor pressure at a temperature of the order of 1200-1600° C., and an organic binder, pressing the mixture to a composite of desired green strength, and then vacuum sintering said composite at the eutectic forming temperature for a period sufficient to remove at least a portion of the non-uranium containing component of said eutectic. The resultant product is a highly densified sintered uranium carbide product. By such a process the deleterious results experienced at sintering temperatures of the order of 2000° C. are avoided. Instead, a fully sintered, virtually all-uranium carbide containing product at its maximum density with virtually no penalty in regard to its physical properties, macroscopic neutron cross section and permissible operating temperature as a nuclear fuel is obtained. However, the advantages achieved by the aforementioned process may be negated by the rather high chemical activity of uranium carbide. It is known, for example, that uranium monocarbide in contact with air at elevated temperatures will oxidize and that when it is reacted with water at temperatures between about 25° C. and 100° C. it hydrolyzes readily to yield a gelatinous hydrous uranium oxide together with a volatile hydrocarbon gaseous mixture. Furthermore, the rate of hydrolysis varies as a function of temperature. With this in mind, it is a principal object of the present invention to provide a method for increasing the corrosion resistance of uranium carbide. The term corrosion resistance is meant to include resistance of reactive carbides to oxidation by air and/or to hydrolysis by water or water vapor.

Another object of this invention is to provide a method of imparting an increased measure of resistance to hydrolysis to a chemically reactive refractory metal carbide.

Another object of this invention is to improve the corrosion resistance of a reactor fuel metal carbide composition by sintering in the presence of a liquid phase.

A further object of this invention is to provide a continuous adherent relatively hydrolysis-resistant coating to a chemically reactive refractory metal carbide powder compact.

Another object of this invention is to provide a continuous adherent relatively hydrolysis-resistant coating to a chemically reactive refractory uranium carbide powder compact.

These and other objects of this invention are accomplished by the method which comprises first forming a homogeneous mixture of a metal carbide powder selected from the group consisting of uranium carbide, thorium carbide and plutonium carbide, at least more than 2 to about 35% (based on the weight of the total mixture), of the corresponding silicide of said selected metal, and an organic binder, pressing said mixture to a desired green strength and preformed shape and then sintering the resultant compact in an inert atmosphere to within about 50° C. above the eutectic which forms between said carbide and said silicide, maintaining said temperatures for a period of time sufficient to sinter said uranium carbide to a desired maximum density and coat said sintered carbide with an adherent continuous coating of said silicide.

The present invention is based on the discovery that a discrete continuous silicide phase can be produced by liquid-phase sintering of certain silicide-carbide mixtures at or above the resultant eutectic forming temperature. At or above the eutectic forming temperature, the metal carbide-silicide mixture will be found to sinter to a highly densified compact. After the sintered compact has cooled from the sintering temperature, the silicide will be found to have apparently wet and flowed along the carbide mass to produce an adherent continuous enveloping silicide phase. The resultant silicide-cemented material is characterized by a distinctly superior resistance to oxidative corrosion and to the hydrolysis by boiling water, in comparison to an uncoated sintered powder compact.

The present invention utilizes the advantages of sintering in a liquid phase by forming a eutectic mixture with a selected silicide corresponding to the metal of the selected metal carbide. As explained in our co-pending application, S.N. 157,052, now U.S. Patent No. 3,118,764, when the silicide is employed as a sintering aid in concentrations of up to about 2% by weight, it will be found that the silicide will be retained within the volume of the finely sintered compact—yet no discrete silicide secondary phase will be evidenced. In such cases it is thought that the silicon atoms replace the carbon in the metal carbide crystal lattice with the substituted carbon atoms migrating from their normal position in the lattice. In marked contradistinction, we have found that when the silicide is used in concentrations greater than 2% by weight and up to about 35% by weight, the silicide will perform not only as a sintering aid depressant in the same way as previously explained, but in this case, upon cooling the resultant sintered carbide compact, instead of forming an essentially all carbide structure, we have found that the silicide will also precipitate and completely envelop the sintered carbide with a continuously adherent silicide layer. Thus, all of the advantages of liquid phase sintering at a depressed sintering temperature are achieved and, in addition, a sintered carbide product is obtained which is considerably more resistant to oxidative corrosive atmosphere and particularly to hydrolysis.

The mechanism by which the precipitating silicide forms a continuous coating about the sintering metal carbide is not completely understood. The normal expectation would be the formation of two discrete metallic phases—a carbide phase and a silicide phase. It is surmised that the formation of the continuous silicide coating occurs because of the ability of the silicide to wet and flow along the surface of the sintering metallic carbide phase much in the same manner as a melting brazing alloy wets and flows along the surfaces to be coated. This mechanism, however, is offered in an explanatory sense and should not be construed otherwise.

A silicide coated composition in accordance with this invention can be obtained by mixing a selected powder carbide with from slightly more than 2 to about 35% by weight of a metal silicide corresponding to the metal of said metal carbide. The upper limit of silicide concentration to be incorporated into the initial mixture will depend upon the desired relative concentration of metal carbide in the finely sintered silicide coating product. However, for practical reasons an upper silicide concentration no more than about 35% by weight has been found to exist. At silicide concentrations greater than about 30% by weight, in addition to coating the sintering metal carbide compact, the liquefied silicide has a tendency to sink to the bottom of reaction vessel in which the liquid sintering is conducted. Apparently, at higher silicide concentrations, the weight of silicide exceeds the surface tension effects which promote wetting and adhesion of the silicide to the sintering or sintered metal carbide.

The choice of a particular silicide will depend, in large measure, upon the ability to wet and flow on the surface of the sintering metal carbide compact and upon the degree of oxidative and hydrolysis resistance desired to be imparted to the resultant compact. For example, in the case where it is desired to form a silicide coating on uranium carbide, the silicide may be selected from $USi$, $USi_2$, $\beta USi_3$, and $U_3Si_2$. Of these silicides, $U_3Si_2$ forms the best protective coating. In a similar manner, where it is desired to produce a silicide coating on thorium carbide the choice of silicides should be made from the aforementioned uranium silicide or from the thorium silicides $Th_3Si_2$, $ThSi$, and $ThSi_2$. In the case where it is desired to form a silicide coating on plutonium carbide the choice of silicide may be made from the uranium silicides or from $Pu_3Si_2$, $Pu_2Si_3$, $PuSi$, or $\alpha,\beta PuSi_2$. Thus, in cases where it is desired to form a densified mixture of different metallic carbides by liquid phase sintering, the selected silicide coating may be made from the silicide corresponding to either of the initial carbides in the mixture. For example, an initial uranium-thorium carbide powder mixture in the ratio of 1 part uranium carbide to 20 parts thorium carbide may have a uranium silicide or a thorium silicide incorporated as the sintering aid depressant. The silicide will, after liquid phase sintering has taken place, wet and flow along the surface of the sintering carbide compact to form a smooth continuous coating thereon.

*Example*

A typical procedure used in preparing silicide-coated carbides utilizing liquid phase sintering to effect densification of chemically reactive carbides will now be explained in detail with reference to a silicide-coated uranium carbide sintered compact.

In this example, the selected carbide was uranium monocarbide and the silicide was $U_3Si_2$. The powdered uranium carbide and silicide was prepared from arc cast ingots of these compounds. The UC ingot was crushed to about −30 mesh size and milled in a ball mill for 48 hours to yield a powder having an average particle size of less than about 10 microns. The same procedure was used to produce a powder from an arc cast silicide ingot. The powders were weighed, mixed together with a solution in either cetyl alcohol or camphor in petroleum ether and blended to form a homogeneous fluidized mixture. The organic binder was present in the compact in the amount of 2%. The organic solvent was evaporated and resultant mixture placed in a die and cold pressed at pressures ranging from about 10 to 100 tons per square inch to a desired green density. Liquid phase sintering was performed in a furnace under a vacuum ($10^{-5}$ mm. Hg) or in an inert gas atmosphere, using a BeO crucible to retain the green-pressed compact. The compact was held at a temperature suitable to form eutectic liquid, about 1650° C., for 3 hours to effect consolidation of the uranium carbide. After sintering the sample was slowly cooled, while still in the presence of the furnace atmosphere, to room temperature. The sintered sample was found to have a smooth, lustrous, hard, continuous coating of uranium silicide with the silicide continuous throughout the internal structure. The following table gives a representative summary of a number of UC compacts fabricated with $U_3Si_2$ as the cementation agent.

| Sintering Aid (Wt percent) | UC Carbon Content (Wt percent) | Theoretical Density [a] (percent)—Sintering Temperature | | | |
|---|---|---|---|---|---|
| | | 1,500° C. | 1,550° C. | 1,600° C. | 1,650° C. |
| 9.1 $U_3Si_2$ [b] | 4.8 | 84.5 | 94.0 | | |
| 18.25 $U_3Si_2$ [b] | 4.8 | 89.5 | 97.5 | | |
| 18.25 $U_3Si_2$ [c] | 4.8 | | | | 97.0 |
| 5.0 $USi_2$ [d] | 4.8 | 81.0 | 87.0 | 93.0 | 97.0 |
| 10.0 $USi_2$ [d] | 4.8 | 70.0 | 81.0 | 92.0 | 97.0 |
| 15.0 $USi_2$ [d] | 4.8 | 72.0 | 84.0 | 93.0 | 97.0 |

[a] Average values determined from duplicate specimens and based on X-ray density of the composite solid involved.
[b] Pressed with 2 wt. percent cetyl alcohol at 30 t.s.i. and fired 1 hr. at temperature.
[c] Pressed with 2 wt. percent cetyl alcohol at 30 t.s.i. and fired 2½ hr. at temperature.
[d] Pressed with 2 wt. percent camphor at 10 t.s.i. and fired 2 hr. at temperature.

Sintered density is seen to generally increase with increasing sintering temperature. For a given sintering temperature $U_3Si_2$ gave higher density than $USi_2$ as an addition. Also $U_3Si_2$ showed greater facility in obtaining the cementation agent as a continuous constituent enveloping the compact. This desired structure was obtained with the compacts sintered at 1600° and 1650° C.

The corrosion resistance of the silicide-coated composition produced as herein before described was tested by immersing it in boiling water. For comparison, an uncoated sintered uranium compact was immersed in boiling water contained in another vessel. The uncoated uranium carbide compact was found to react with the hot water almost immediately to produce a gelatinous precipitate accompanied by voluminous gaseous evolution. In marked contrast, evidence of reaction of the silicide coated carbide with the hot water was not observed after four hours and longer.

While it has previously been stated that for a given metal carbide the corresponding silicide may be used to effect liquid phase sintering and form a continuous silicide coating on the metal carbide, it should be noted that the silicides have varying capacities to wet and flow along the surface of the corresponding metal carbide. For example, in the case where it is desired to form a silicide coating on uranium carbide, it has been found that $U_3Si_2$, as used in the foregoing example, has better wetting and flow characteristics than $USi_2$.

In order to assure the maximum wetting and flow characteristics from any of the selected silicides we have found it to be very useful and expedient to incorporate a small amount of from 0.05 to 0.5 by weight percent based on the weight of the total mixture of a metal powder (.1 to .5 micron in size) selected from copper, silver, gold, nickel, iron and cobalt into the initial powdered carbide-silicide mixture. Incorporating these metal powders into the mixture has been found to promote the wetting and flow characteristics of the silicide so that it readily wets, flows and subsequently deposits a uniform silicide coating on the sintering metal carbide composite.

The products of this invention are useful as reactor fuel compositions under at least the same circumstances as the uncoated carbides with the additional advantages of being far more corrosion resistant than the uncoated carbides. In effect, the corrosion resistance of the silicide will determine the corrosion resistance of the carbide.

Having thus described our invention, what we claim is:

1. An improved method of fabricating a relatively corrosion resistant metal carbide selected from the group of uranium carbide, thorium carbide and plutonium carbide which comprises forming a homogeneous mixture of the powdered form of said carbide with at least more than 2 and no more than about 35% by weight of a silicide selected from the group uranium, thorium and plutonium and an organic binder, pressing said mixture to a desired green strength and to a desired preformed shape, heating said preformed shape in an inert atmosphere to above the eutectic which forms between said carbide and said silicide, maintaining said temperature for a sufficient time to sinter said carbide to a desired density up to the theoretical density of the resistant composite carbide, while said silicide wets and flows on the surface of said sintering carbide, and thereafter cooling the resultant sintered carbide to form a hard, smooth, continuous adherent coating thereon.

2. A method for fabricating an improved corrosion resistant uranium composition which comprises forming a powdered mixture of uranium carbide at least 2 and up to no greater than about 35%, by weight, of a uranium silicide which forms a eutectic with said carbide, and an organic binder, pressing said mixture to a desired green strength and a desired preformed shape, heating said pressed shape in an inert atmosphere to above the eutectic, maintaining said temperature for a time sufficient to sinter said carbide to a desired density up to the theoretical density of the composite carbide while said silicide wets and flows on the surface of said sintered carbide and thereafter cooling said sintering carbide to allow the formation of a smooth, hard continuous and adherent silicide coating on said carbide.

3. The method according to claim 2 wherein the uranium carbide is uranium monocarbide.

4. The method according to claim 2 wherein the silicide is $U_3Si_2$.

5. An improved method of fabricating a relatively corrosion resistant metal carbide selected from the group of uranium carbide, thorium carbide and plutonium carbide which comprises forming a homogeneous mixture of the powdered form of said carbide with at least more than 2 and no more than about 35% by weight of a silicide selected from the group uranium, thorium and plutonium, an organic binder and from 0.05 to 0.5 weight percent of a metal powder selected from copper, silver, gold, uranium, nickel and cobalt, pressing said mixture to a desired green strength and to a desired preformed shape, heating said pressed shape in an inert atmosphere to above the eutectic which forms between said carbide and said silicide, maintaining said temperature for a sufficient time to sinter said carbide to a desired density up to the theoretical density of the composite carbide, while said silicide wets and flows on the surface of said sintering carbide and thereafter cooling the resultant sintered carbide to form a hard, smooth, continuous adherent coating thereon.

6. An improved nuclear reactor fuel sintered composition having an internal structure comprising a continuous metal silicide matrix, said metal being selected from uranium, thorium and plutonium, a nuclear fuel compound selected from uranium carbide, thorium carbide and plutonium carbide distributed within said matrix and an adherent coating of said silicide integral with said internal structure, said silicide consisting of at least more than 2 and no greater than about 35%, by weight, of said composition.

7. An improved nuclear reactor fuel composition comprising an internal structure of a uranium carbide distributed within a continuous matrix of a uranium silicide and a continuous adherent coating of said silicide integral with said internal structure, said silicide consisting of at least 2 and no greater than about 35%, by weight of the total composition.

8. An improved nuclear reactor fuel composition comprising an internal structure of a uranium monocarbide distributed with a continuous matrix of a uranium silicide and a continuous, adherent coating of said silicide integral with said internal structure, said silicide consisting of at least 2 and no greater than about 35%, by weight, of said total composition.

9. An improved nuclear reactor fuel composition comprising a sintered compact having an internal structure of uranium monocarbide distributed within a matrix of uranium disilicide, $USi_2$ and a continuous, adherent coating of said silicide integral with said internal structure, said silicide consisting of at least 2 and no greater than about 35% by weight, of said composition.

10. An improved nuclear reactor fuel composition comprising a sintered compact having an internal structure of uranium monocarbide distributed within a matrix of $U_3Si_2$ and a continuous, adherent coating of said silicide integral with said internal structure, said silicide consisting of at least 2 and no greater than about 35%, by weight, of said composition.

11. An improved nuclear reactor fuel composition comprising a sintered compact having an internal structure of uranium dicarbide distributed within a matrix of uranium disilicide, $USi_2$ and a continuous, adherent coating of said silicide integral with said internal structure, said silicide consisting of at least 2 and no greater than about 35%, by weight, of said composition.

12. An improved nuclear reactor fuel composition comprising a sintered compact having an internal structure of uranium dicarbide distributed within a matrix of $U_3Si_2$ and a continuous, adherent coating of said silicide integral with said internal structure, said silicide consisting of at least 2 and no greater than about 35%, by weight, of said composition.

13. An improved nuclear reactor fuel composition comprising a sintered compact having an internal structure of plutonium carbide distributed within a matrix of a plutonium silicide and a continuous, adherent coating of said silicide integral with said internal structure, said silicide consisting of at least 2 and no greater than about 35%, by weight, of said composition.

14. An improved nuclear reactor fuel composition comprising a sintered compact having an internal structure of plutonium carbide distributed within a matrix of PuSi and a continuous, adherent coating of said silicide integral with said internal structure, said silicide consisting of at least 2 and no greater than about 35%, by weight, of said composition.

15. An improved nuclear reactor fuel composition comprising a sintered compact having an internal structure of PuC distributed within a matrix of $Pu_3Si_2$ and a continuous, adherent coating of said silicide integral with said internal structure, said silicide consisting of at least 2 and no greater than about 35%, by weight, of said composition.

16. An improved nuclear reactor fuel composition comprising a sintered compact having an internal structure of PuC distributed within a matrix of $\alpha,\beta PuSi_2$ and a continuous, adherent coating of said silicide integral with said internal structure, said silicide consisting of at least 2 and no greater than about 35%, by weight, of said composition.

17. An improved nuclear reactor fuel composition comprising a sintered compact having an internal structure of PuC distributed within a matrix of $PuSi_2$ and a smooth continuous, adherent coating of said silicide integral with said internal structure, said silicide consisting of at least 2 and no greater than about 35%, by weight, of said composition.

18. An improved nuclear reactor fuel composition comprising a sintered compact having an internal structure of ThC distributed within a matrix of ThSi and a smooth, continuous, adherent coating of said silicide integral with said internal structure, said silicide consisting of at least 2 and no greater than about 25%, by weight, of said composition.

19. An improved nuclear reactor fuel composition comprising a sintered compact having an internal structure of ThC distributed within a matrix of $Th_3Si_2$ and a smooth, continuous, adherent coating of said silicide integral with said internal structure, said silicide consisting of at least 2 and no greater than about 35%, by weight, of said composition.

20. An improved nuclear reactor fuel composition comprising a sintered compact having an internal structure of ThC distributed within a matrix of $ThSi_2$ and a smooth, continuous, adherent coating of said silicide integral with said internal structure, said silicide consisting of at least 2 and no greater than about 35%, by weight, of said composition.

References Cited in the file of this patent

UNITED STATES PATENTS

| | | |
|---|---|---|
| 2,244,052 | Comstock | June 3, 1941 |
| 2,751,668 | Turner et al. | June 26, 1956 |
| 2,848,352 | Noland et al. | Aug. 19, 1958 |
| 2,950,238 | Nicholson | Aug. 23, 1960 |

FOREIGN PATENTS

| | | |
|---|---|---|
| 1,055,704 | Germany | Apr. 23, 1959 |

OTHER REFERENCES

AEC Document, NDA-2140-2, October 1959, pp. 44 and 46. (Copy in Div. 46.)

Hausner et al.: Nuclear Fuel Elements, November 1959, pp. 197-202. (Copy in Library.)

AEC Document, TID-7622, October 1961, pp. 103 and 104. (Copy in Div. 46.)